A. C. WOOD.
REFLECTOR LAMP.
APPLICATION FILED OCT. 4, 1920.
1,417,123.
Patented May 23, 1922.
2 SHEETS—SHEET 1.
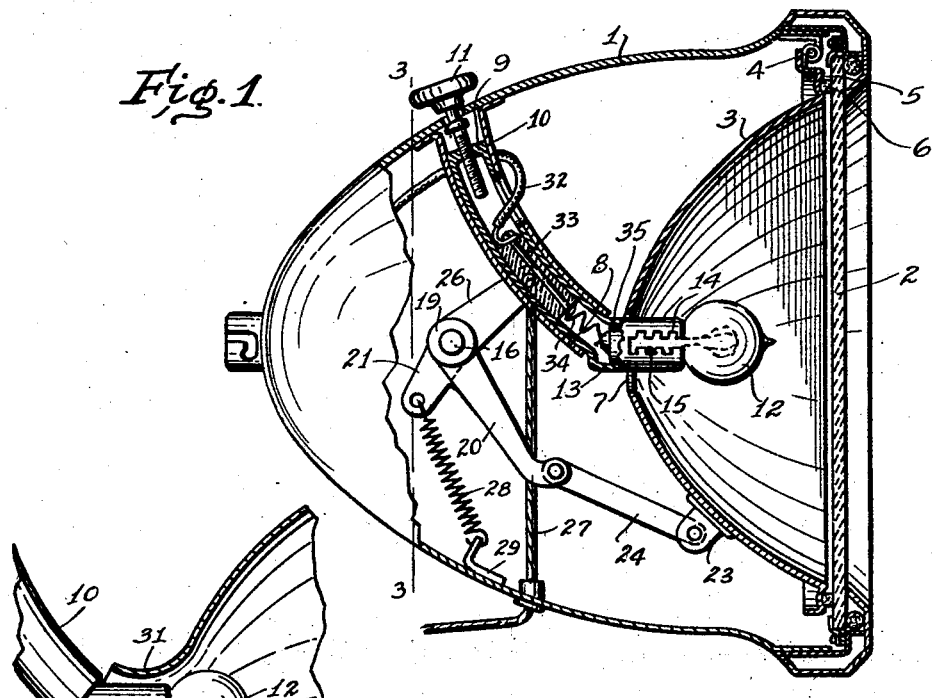
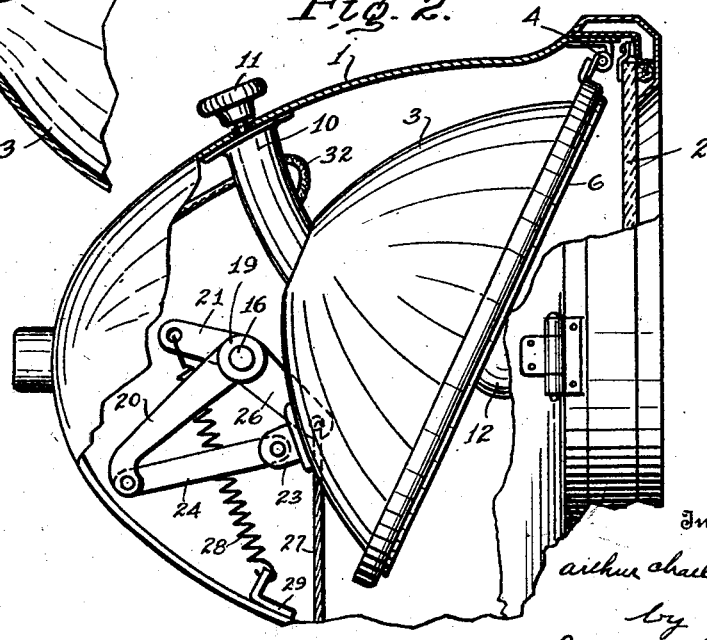

A. C. WOOD.
REFLECTOR LAMP.
APPLICATION FILED OCT. 4, 1920.

1,417,123.

Patented May 23, 1922.
2 SHEETS—SHEET 2.

Inventor
Arthur Charles Wood

UNITED STATES PATENT OFFICE.

ARTHUR CHARLES WOOD, OF MANSFIELD, OHIO, ASSIGNOR, BY MESNE ASSIGNMENTS, TO THE MANSFIELD LAMP AND MANUFACTURING COMPANY.

REFLECTOR LAMP.

1,417,123.      Specification of Letters Patent.      Patented May 23, 1922.

Application filed October 4, 1920. Serial No. 414,508.

*To all whom it may concern:*

Be it known that I, ARTHUR C. WOOD, a subject of Great Britain, residing at Mansfield, in the county of Richland and State of Ohio, have invented certain new and useful Improvements in Reflector Lamps, of which the following is a specification.

This invention relates to means for changing the direction of the projection of rays of light.

The present invention relates to improvements of the invention shown and described in an application filed by Arthur Charles Wood December 31st, 1919 Serial Number 348,516 entitled, Lamp Dimmer.

One of the objects of this invention is to support a parabolic reflector or the like upon a hinge to permit of imparting an oscillating, or pivotal movement thereto independently of the light source, by suitable operating mechanism.

A further object is to provide a telescopic curved holding bracket for holding a light globe at the center of a hinged reflector, and positioning said holding bracket in the path of said tiltable or hinged reflector thereby permitting the reflector to travel in a path of the same curvature as the holding bracket, and affording means for tilting the entire reflector without cutting away any portion thereof.

Another object is to so form and construct a reflector and to associate a light source therewith in such a manner as to obtain the maximum efficiency from the light source in directing the projection and reflection of rays of light from the reflector.

Another object is to support a parabolic reflector on a casing and to provide for a tilting or pivotal movement thereof, independently of the light source, to permit the light source to remain in a stationary or fixed position, while the tilting movement is being imparted to the reflector thereby affording means of changing the direction, projection and reflection of the light rays and glare of the light from shooting straight ahead of the car and in the range of the vision of the driver of an oncoming car. And in constructing and operating said parts in such a manner as to provide means of directing, scattering and diffusing the light rays in front of the car on the road bed at an angular relation to the vertical plane of the lens and range of vision of the driver of an oncoming car, without moving or changing the light source or affecting the light on the road bed by dimming same in the conventional manner which operation reduces the intensity and illumination of the light, thereby endangering the safety of driver and car because of the poor illumination of the road bed, after dimming.

Another object is to provide a bracket which affords facilities for adjusting and holding the light source to focus in various horizontal parallel relation from the center of the reflector.

These and other objects are attained by the mechanism illustrated in the accompanying drawings in which—

Fig. 1, is a side elevation of the invention partly in section showing it applied to a conventional type of a parabolic reflector, showing the reflector in normal position.

Fig. 2, is a side elevation of Fig. 1, showing the reflector in a tilted position.

Fig. 5, shows a modified form of a reflector showing its association with the light source and holding bracket.

Figure 3:
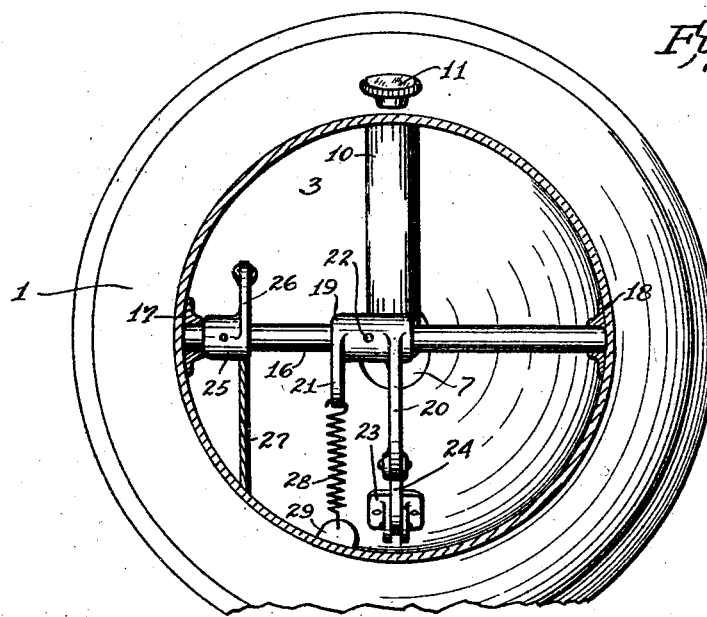
Fig. 3, is a rear view of Fig. 1, on the line 3—3.
Figure 4:
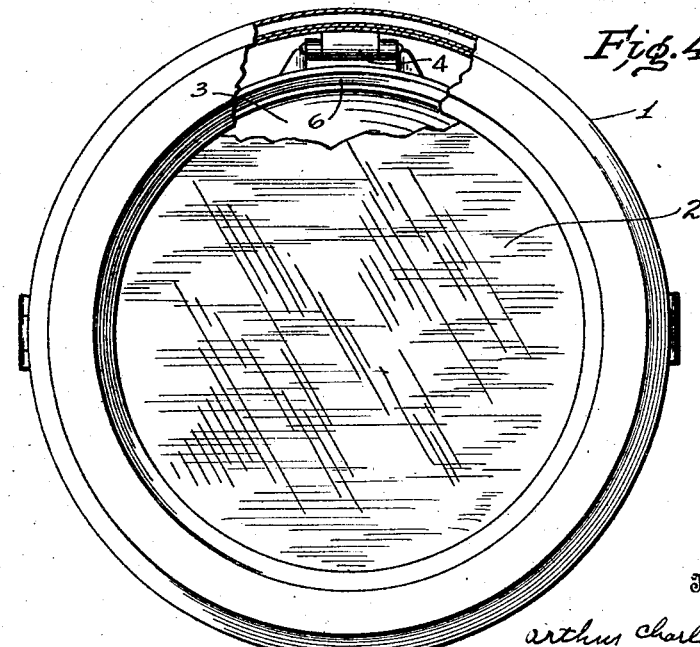
Fig. 4, is a front view of Fig. 1, with a part broken away to show the method of hinging the reflector for tilting or pivotal movement.

In the preferred embodiment of the invention reference numeral 1 represents a lamp casing of a conventional parabolic type and 2 the lens which is fastened thereto in any well known manner. The parabolic reflector 3, is hinged at the top of the casing at 4, in any well known manner. The weight of the reflector automatically maintains the reflector in its normal position as shown in Fig. 1.

The reflector is preferably provided with an annular grooved portion 5 to engage an annular member 6 which is preferably made of felt or the like and interposed between the lens and reflector to cushion the impact of the reflector against the lens upon its return to its normal position after being tilted and also to absorb the shock or vibration due to the contact of the parts.

The reflector is provided with a central aperture 7. A curved holding bracket 8, comprising the parts 9 and 10 which are telescopically connected for movement relative to each other, is provided and secured at a predetermined point to the inner surface of the casing with its free end curving toward and projecting into and through the aperture 7 in the reflector.

The part 9 of the bracket can be adjusted relative to the part 10 by the thumb screw 11 which provides means of adjusting the light source 12 toward and from the reflector to change the focus of the light source when desired.

Another means of changing the focus of the light source, consists in providing a socket and sleeve connection 13 between the light and bracket. To hold and maintain the light source in a pre-determined horizontal position with respect to the center of the reflector, a plurality of bayonet slots 14 are formed in the sleeve to cooperate with the pin 15 provided on the socket, thereby providing means of securely holding and locking the light source in different parallel horizontal positions with respect to its distance from the reflector. It will be observed that two separately operable and co-operative means are provided to adjustably hold and maintain the light source at different distances from the reflector in horizontal parallel relation to the central portion of the reflector, thereby affording two means for changing the focus of the light source from the reflector. The bracket 9 is curved to conform to the same path that the aperture 7 formed in the reflector travels when a tilting movement is imparted to the reflector.

To pivot or tilt the reflector to follow the path defined by the curved bracket, the following mechanism is constructed and applied thereto. A rotatable shaft 16 is journaled in bearings 17 and 18, said bearings being secured to the lamp casing in spaced relation to and behind the reflector. A hub 19 which is provided with a crank 20 and an angularly related crank arm 21, is mounted upon and securely fastened to the shaft 16 preferably by a pin 22.

A bifurcated bracket 23 is attached to the exterior of the lamp reflector and a link 24 is provided to connect the bracket 23, to the free end of the crank 20. A member 25 which is provided with a crank arm 26 is spaced apart from the crank 20 and secured to the shaft 16 in angular relation to the crank 20 providing a mechanism that will perform the function of a bell crank. A cord or cable 27 is secured to the free end of the crank arm 26. When a pull is exerted upon the cable, the mechanism connected to the reflector is actuated to impart a tilting, or pivotal movement to the reflector forcing it to pivot rearwardly over the curved bracket 8 and to a position in angular relation to the light source 12. When the cable is released the reflector automatically pivots or returns to its normal position as shown in Fig. 1.

The return or pivoting of the reflector to its normal position is preferably accelerated by the tension of a spring 28 which is interposed between and attached to the arm 21 provided on the hub 19 and the part 29 which is fastened to the interior of the lamp casing. When the shaft 16 is rotated by the actuation of the crank arm 26, the spring 28 will be expanded creating a tension therein which tension exerts a pull to accelerate return of the reflector to its normal position, when the crank arm 26 is released.

In the modification shown in Fig. 5, the reflector is provided with a hollow, elongated portion or neck 31, which permits the light source to be secured to the holding bracket in close proximity to the reflector, thereby providing means for securing the maximum efficiency and number of shooting or reflecting rays of light that can be projected from a parabolic reflector.

The central aperture 7 of reflector is preferably elongated underneath the socket and sleeve connection, to provide clearance for the parts when movement is imparted to the reflector.

The electric current to the light source is preferably conducted thereto by a conductor 32 from any source of supply, flowing through the bolt 33; thence through the yielding member 34 to the light source. The yielding member 34 is connected to the bolt 33 and engages the socket plug 35.

In the operation of the reflector for the purpose intended attention is called to the fact that when the reflector is in its normal position that the beam or shaft of light is intensely projected on the road straight ahead of the car illuminating the road bed as far ahead of the car as the power of the light will permit; and when an oncoming car is approaching, that is being driven from an opposite direction, the operator of the car equipped with the present invention does not dim his lights, but simply exerts a pull upon the cable 27 thereby tilting the reflector which instantly moves the light source out of focus with the reflector causing the rays of light from the reflector to project and diffuse upon the road bed directly in front of the car and outside the range or vision of the eyes of the driver of the oncoming car.

It will thus be observed that protection against the glare of the projected rays of light is afforded to the driver of an oncoming car by the driver of a car which is being driven in an opposite direction without affecting or dimming the illumination of the road bed directly in front of the car equipped with the invention herein described.

Attention is called to the fact that in the actuation of the reflector to tilt same to change the direction of projection of the shooting rays of light, that when the reflector is tilted and during the operation of tilting, that the rays of light projecting from the reflector spread out and extend a greater distance beyond the road bed than a reflector in normal position.

I claim.

1. In a means for changing the direction of the projection of rays of light, a casing, a parabolic reflector hinged thereto, a curved bracket secured to said casing and means connected to said hinged reflector to actuate the reflector to travel in a path of the same curvature as the curved bracket and thereover.

2. In a means for changing the direction of the projection rays of light, a casing, a parabolic reflector hinged thereto, a curved stationary bracket secured to said casing, means connected to said hinged reflector to actuate the reflector to travel in a path of the same curvature as the curved bracket and an electric light bulb removably secured to the free end of the bracket and adapted to be adjusted to and from the reflector.

3. In a means for changing the direction of rays of light, a casing, a reflector provided with a central aperture which is hinged to the casing and adapted to be maintained in normal position by the force of gravity, a fixed curved bracket attached to said casing having its free end alined with the aperture in the reflector and means to impart a pivotal movement to said reflector to force it to travel over said curved bracket.

4. In a means for changing the direction of the projection of rays of light, the combination of a casing provided with a tiltable reflector and a central aperture, a curved bracket supporting a light source attached to said casing having its free end depending and extending through said aperture, and means to force the reflector to pivot and travel in the path of and over said curved bracket, independently of the light source.

5. In a reflector lamp, a casing, a reflector provided with a central aperture which is hinged to the top of the casing, a curved support for an electric light globe attached to the casing having its free end projecting through the aperture in the reflector, means to actuate the reflector to swing over the curved support and means to adjust the focus of the light source from the outside of the casing.

6. In a reflector lamp, a casing, means to hinge a reflector to the casing for movement to and from the front of the casing, a curved support attached to the casing at one end and having the opposite end projecting through a central aperture provided in the reflector, an electric light globe adjustably secured to said support and means to actuate the reflector to travel over the curved support.

7. In a reflector lamp, the combination with a casing, of a curved fixed means to support an electric light globe at the horizontal axis thereof and a swinging reflector which is hinged at the top to the casing and adapted to travel over the curved fixed supporting means of the electric light globe.

8. In a reflector lamp, a casing, a reflector provided with a central aperture and arranged to swing within the casing, a curved fixed support for an electric light globe having its free end projecting through the central aperture of the reflector, dual means to adjust the electric globe toward and away from the reflector, operable from the outside of the casing and from within the casing, means to swing the reflector to force it to travel upward and over the support and means to return the reflector to its normal position automatically.

In testimony whereof I, affix my signature.

ARTHUR CHARLES WOOD.